US008655397B2

United States Patent
Hosono

(10) Patent No.: US 8,655,397 B2
(45) Date of Patent: Feb. 18, 2014

(54) METHOD OF MOBILE COMMUNICATION FOR A RADIO BASE STATION

(75) Inventor: Hiroyuki Hosono, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 518 days.

(21) Appl. No.: 12/996,508

(22) PCT Filed: Jun. 5, 2009

(86) PCT No.: PCT/JP2009/060386
§ 371 (c)(1),
(2), (4) Date: Feb. 2, 2011

(87) PCT Pub. No.: WO2009/148164
PCT Pub. Date: Dec. 10, 2009

(65) Prior Publication Data
US 2011/0124366 A1    May 26, 2011

(30) Foreign Application Priority Data
Jun. 6, 2008  (JP) ................................ 2008-149972

(51) Int. Cl.
*H04W 52/06*  (2009.01)
*H04W 52/24*  (2009.01)

(52) U.S. Cl.
USPC ........................................ 455/522; 455/562.1

(58) Field of Classification Search
None
See application file for complete search history.

(56) References Cited

U.S. PATENT DOCUMENTS

| | | | |
|---|---|---|---|
| 6,556,839 | B1 | 4/2003 | Kondo |
| 2002/0168993 | A1 | 11/2002 | Choi et al. |
| 2006/0111137 | A1 | 5/2006 | Mori et al. |
| 2007/0173259 | A1 | 7/2007 | Akihara |
| 2009/0111499 | A1* | 4/2009 | Bosch et al. ............... 455/522 |

FOREIGN PATENT DOCUMENTS

| | | |
|---|---|---|
| CN | 1462515 A | 12/2003 |
| JP | 10 23519 | 1/1998 |
| JP | 2001 77724 | 3/2001 |
| JP | 2005 125249 | 12/2005 |
| JP | 2006 135673 | 5/2006 |
| JP | 2007 306407 | 11/2007 |
| JP | 2007 329758 | 12/2007 |
| WO | WO 2007/048750 A1 | 5/2007 |

OTHER PUBLICATIONS

Office Action issued on Jan. 23, 2013, in Chinese Patent Application No. 200980121209.0 with English translation.

(Continued)

*Primary Examiner* — Philip Sobutka
(74) *Attorney, Agent, or Firm* — Oblon, Spivak, McClelland, Maier & Neustadt, L.L.P.

(57) ABSTRACT

A mobile communication method, in which radio base stations transmit common control signals to all of their covering areas, includes a first radio base station determining a reception power level of a common control signal transmitted by a surrounding radio base station; the first radio base station adjusting, based on the determined reception power level of the common control signal, the transmission power level of the common control signal; and (C) the first radio base station and surrounding radio base station, when having detected that no mobile stations are existent under charge of those radio base stations, reducing the transmission power levels of the common control signals.

6 Claims, 4 Drawing Sheets

(56) References Cited

OTHER PUBLICATIONS

Tobe, H. et al., "Autonomous Cell Shaping Method Based on the Arrangement of Base Stations", Proceedings of the 2002 Institute of Electronics, Information and Communication Engineers General Conference, Collection of Lecture Papers, p. 520, B-5-70, Section 2, Fig. 1, Total pp. 5, (Mar. 7, 2002) (with English translation).

3GPP TSG RAN #35, "Requirements for LTE Home eNodeBs", RP-070209, Orange, Telecom Italia, T-Mobile, Vodafone, Agenda Item: 10:19, Discussion & Decision, Total pp. 4, (Mar. 6-9, 2007).

International Search Report issued Jun. 30, 2009 in PCT/JP09/060386 filed Jun. 5, 2009.

Japanese Office Action issued on May 8, 2012, in Patent Application No. 2010-515945 with English Translation.

Office Action issued Jul. 3, 2013 in Chinese Patent Application No. 200980121209.0 (with English language translation).

Takahiro Hayashi, et al., "A Study of Transmission Power Allocation in Downlink Common Control Channels in W-CDMA System", NTT Mobile Communications Network Inc., B-5-81, 2000, p. 466 (with English translation).

Shinichi Mori, et al., "Field Experiments for Service Area Evaluation in W-CDMA with Receiving Quality Measurement Systems", NTT DoCoMo, Inc., B-5-34, 2001, p. 432 (with English translation).

* cited by examiner

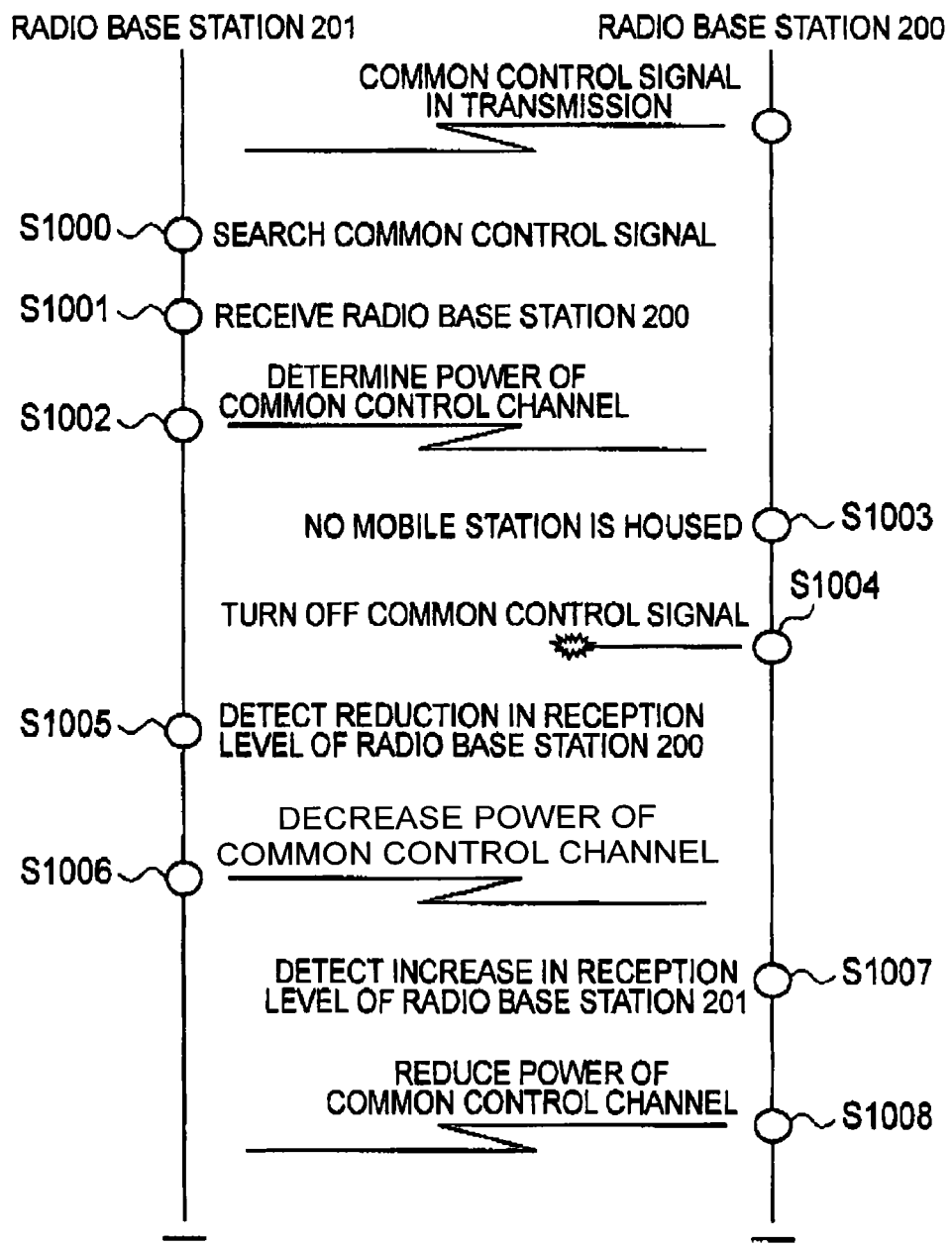

METHOD OF MOBILE COMMUNICATION FOR A RADIO BASE STATION

TECHNICAL FIELD

The present invention relates to a mobile communication method with which radio base stations each transmit a common control signal to the entire coverage area thereof, and to a radio base station configured to transmit a common control signal to the entire coverage area thereof.

BACKGROUND ART

In a mobile communication system, in general, the following bothersome cell system design/evaluation works are required in order to meet the service quality requirements for communication establishment requests issued from mobile stations at random. Specifically, prior to the construction of a radio base station for public communications, an installation location and a configuration of the radio base station for public communications, and radio-communications parameters such as a transmission power level of a downlink common control signal are designed on paper through simulations and the like with a service area (coverage areas) and traffic thereof estimated. Then, after the construction of the radio base station for public communications, the measurement check, maintenance, and the like of the service area, communication quality, and system capacity are performed repeatedly.

Although these are the operation for the radio base station for public communications, basically the same operation as that for the radio base station for public communications is expected to be performed also for a radio base station placed in a small-sized area such as a house, like the one called a "home radio base station (Home eNB)."

SUMMARY OF THE INVENTION

However, since such a home radio base station is flexibly placed in the small-sized area such as a house, an extremely larger number of home radio base stations than that of the aforementioned radio base station for public communications are expected to be placed. This would bring a problem that much effort is expended on the aforementioned cell system design/evaluation works.

Further, in an area densely packed with households, such as an apartment building, home radio base stations are also expected to be densely arranged. This would bring a problem that the aforementioned cell system design/evaluation works become extremely complicated.

In order to address such problems, a method of reducing the works required for the aforementioned cell system design/evaluation is known, in which a home radio base station measures a reception power level of a common control signal transmitted by a neighboring radio base station, and self-adjusts a transmission power level of a common control signal of the station itself on the basis of the reception power level.

However, a second home radio base station adjacent to a first home radio base station and installed later than the first home radio base station will have a smaller coverage area than the first home radio base station in some cases depending on a reception power level of a common control signal transmitted by the first home radio base station. This would bring a problem that unfairness in coverage area occurs between the home radio base stations.

The present invention has been therefore made in view of the aforementioned problems, and has an objective to provide a mobile communication method and a radio base station with which home radio base stations adjacent to each other can fairly adjust their coverage areas by themselves.

A first aspect of the present invention is summarized as a mobile communication method with which radio base stations each transmit a common control signal to an entire coverage area thereof, the method comprise step A of causing a first radio base station to measure a reception power level of a common control signal transmitted by a neighboring radio base station, step B of causing the first radio base station to adjust a transmission power level of the common control signal on the basis of the measured reception power level of the common control signal, and step C of causing each of the first radio base station and the neighboring radio base station to reduce the transmission power level of the common control signal if detecting a condition where no mobile station under control of the radio base station exists.

In the first aspect, wherein, in the step C, each of the first radio base station and the neighboring radio base station stops transmitting the common control signal for a predetermined period of time if detecting that no mobile station under control of the radio base station exists.

In the first aspect, wherein, in the step B, the first radio base station adjusts the transmission power level of the common control signal on the basis of an average value of the reception power levels of the common control signal measured for a predetermined measurement period.

In the first aspect, wherein, in the step A, the first radio base station identifies the common control signal transmitted by the neighboring radio base station, by using at least one of a predetermined frequency, timing, and code.

In the first aspect, wherein, in the step B, the first radio base station reduces the transmission power level of the common control signal if the average value falls below a first threshold, and increases the transmission power level of the common control signal if the average value exceeds a second threshold.

A second aspect of the present invention is summarized as a radio base station configured to transmit a common control signal to an entire coverage area thereof, the radio base station comprise a measurement unit configured to measure a reception power level of a common control signal transmitted by a neighboring radio base station, and an adjustment unit configured to adjust a transmission power level of the common control signal on the basis of the measured reception power level of the common control signal, wherein the adjustment unit reduces the transmission power level of the common control signal if detecting a condition where no mobile station under control of the radio base station exists.

In the second aspect, wherein the adjustment unit stops transmitting the common control signal for a predetermined period if detecting that no mobile station under control of the radio base station exists.

In the second aspect, wherein the adjustment unit adjusts the transmission power level of the common control signal on the basis of an average value of the reception power level of the common control signal measured for a predetermined measurement period.

In the second aspect, wherein the adjustment unit identifies the common control signal transmitted by the neighboring radio base station by using at least one of a predetermined frequency, timing, and code.

In the second aspect, wherein the adjustment unit reduces the transmission power level of the common control signal if the average value falls below a first threshold, and increases the transmission power level of the common control signal if the average value exceeds a second threshold.

As described above, according to the present invention, it is possible to provide a mobile communication method and a radio base station with which home radio base stations adjacent to each other can fairly adjust their coverage areas by themselves.

BRIEF DESCRIPTION OF THE DRAWINGS

FIG. 4 is a sequence diagram showing an operation of the mobile communication system according to the first embodiment of the present invention.

BEST MODE FOR CARRYING OUT THE INVENTION (Configuration of Mobile Communication System According to First Embodiment of Present Invention)

A mobile communication system according to a first embodiment of the present invention is described with reference to FIGS. 1 through 3.

Figure 1:
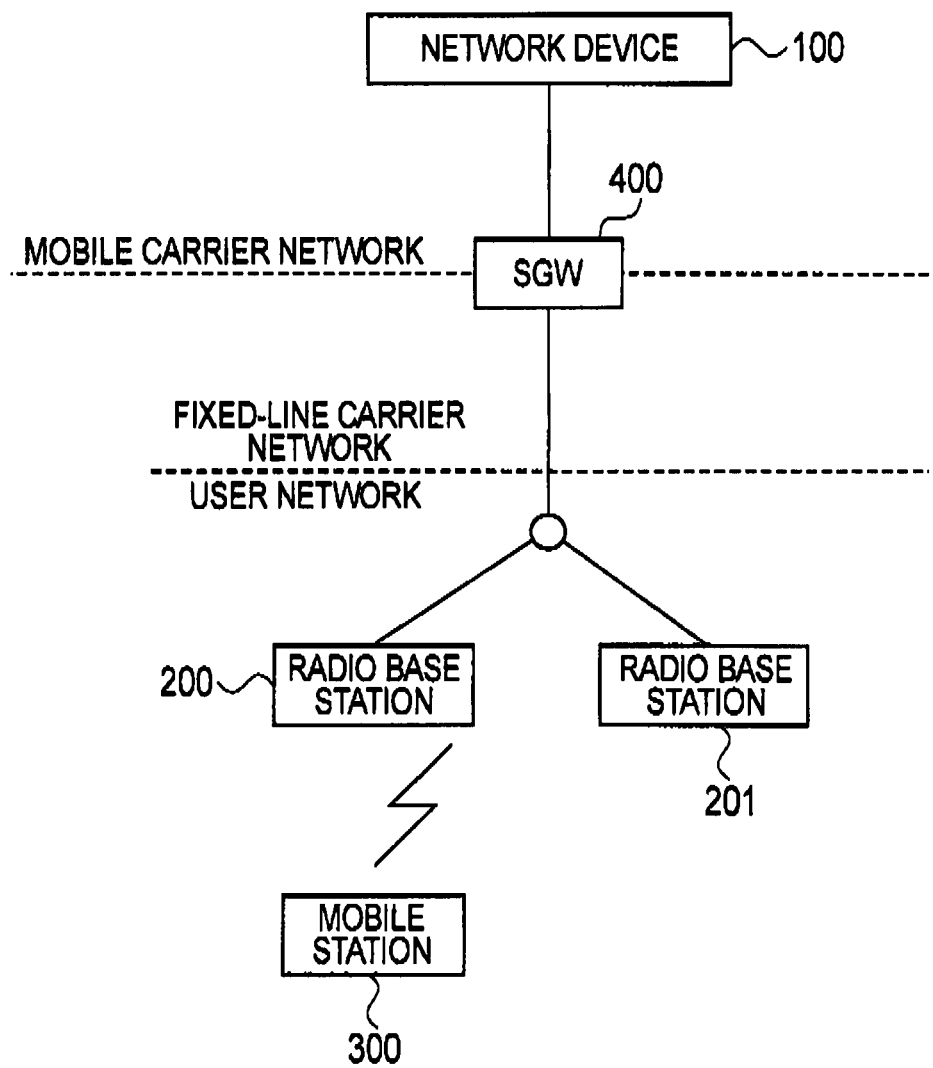
FIG. 1 is an overall configurational diagram of a mobile communication system according to a first embodiment of the present invention.

As shown in FIG. 1, the mobile communication system according to this embodiment includes a network device 100, a security device SGW (Security Gateway) 400, and radio base stations 200 and 201.

Here, the radio base stations 200 and 201 are housed in the network device 100. Moreover, the network device 100 is configured to assign each of the radio base stations 200 and 201 radio communication parameters to be used in radio communications between the corresponding one of the radio base stations 200 and 201 and a mobile station 300, and to manage the radio communication parameters.

In this regard, if the mobile communication system according to this embodiment is a W-CDMA mobile communication system, the function of the network device 100 is installed in a radio control device RNC.

Note that, the radio base stations 200 and 201 are home radio base stations under management of users (owners of the radio base stations 200 and 201) who subscribe to communication services provided by mobile carriers.

For example, the radio base stations 200 and 201 are placed in LANs (Local Area Networks) managed by the aforementioned users, and are configured to be connected to the network device 100 on mobile carrier networks via FTTH or ADSL access carrier networks.

Meanwhile, the SGW 400 is placed at the boundary between the mobile carrier networks. The SGW 400 is a gateway device configured to protect the mobile carrier networks against unauthorized access from other networks, and is configured to allow only the access authorized through an authentication procedure to the mobile carrier networks.

Since the functions of the radio base stations 200 and 201 are basically the same, the function of the radio base station 200 is hereinafter described on behalf of the radio base stations.

Figure 2:
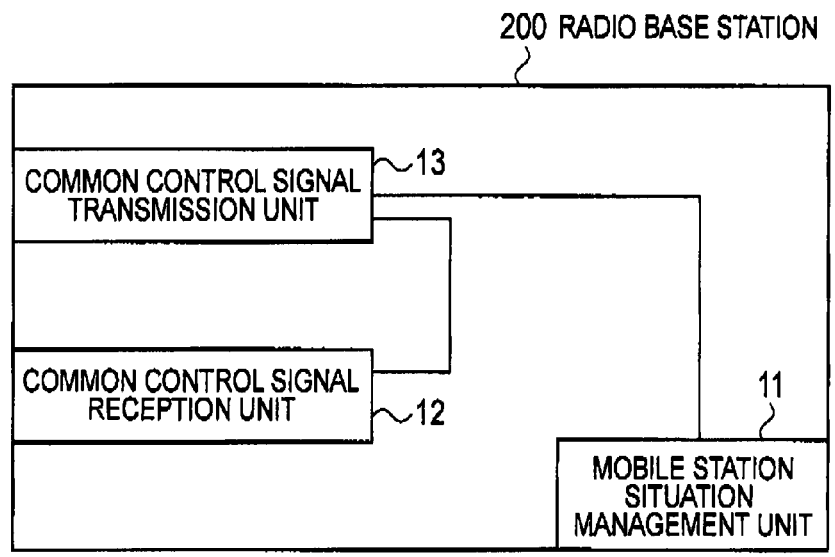
FIG. 2 is a functional block diagram of a radio base station according to the first embodiment of the present invention.

As shown in FIG. 2, the radio base station 200 includes a mobile station situation management unit 11, a common control signal reception unit 12, and a common control signal transmission unit 13.

The mobile station condition management unit 11 is configured to perform management on whether or not a mobile station in communication exists in cells under control of the radio base station 200, or whether or not a mobile station in standby exists in the cells under control of the radio base station 200.

The mobile communication system according to this embodiment is designed on the assumption that cells under control of a home radio base station (femtocells) are respectively assigned location registration area IDs which are different from each other. Hence, the mobile station condition management unit 11 may be configured to check with its upper node as to whether or not there is a mobile station which has registered its position in the cells under control of the radio base station 200 (femtocells).

The mobile station condition management unit 11 may also be configured to perform management on whether or not a mobile station in standby exists by acquiring location registration area signals transmitted by mobile stations.

The common control signal reception unit 12 is configured to receive a common control signal transmitted by a neighboring radio base station, and to measure a reception power level of the common control signal.

Figure 3:
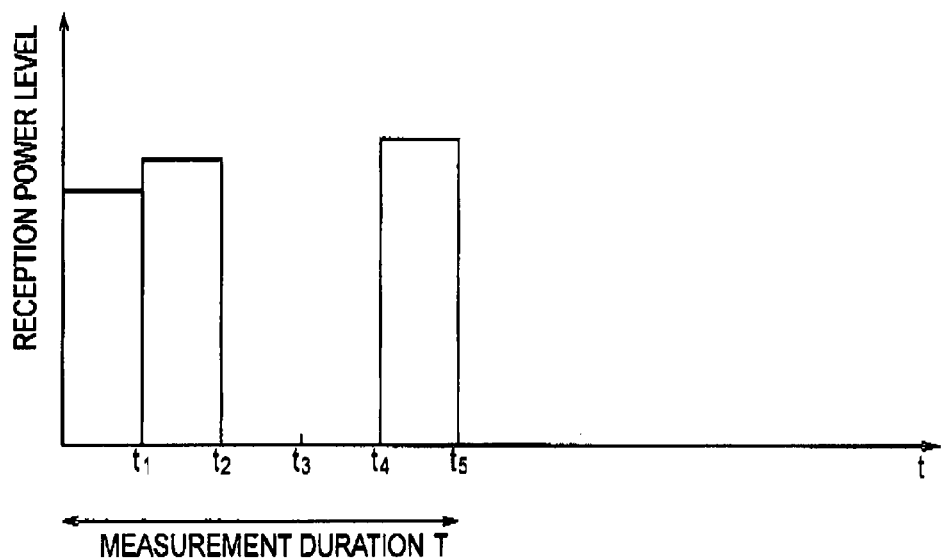
FIG. 3 is a diagram showing an example of a reception power level of a common control signal received by the radio base station according to the first embodiment of the present invention.

The common control signal reception unit 12 may also be configured to calculate an average value of measured reception power levels of the common control signal in a given measurement duration T, as shown in FIG. 3.

Here, the common control signal reception unit 12 is configured to identify the common control signal transmitted by the neighboring radio base station by using at least one of a predetermined frequency, timing, and code.

The common control signal transmission unit 13 is configured to transmit a common control signal to the entire coverage area (cell(s)).

Specifically, the common control signal transmission unit 13 is configured to adjust a transmission power level of the common control signal on the basis of the reception power level of the common control signal measured by the common control signal reception unit 12 (or of the average value of the reception power levels of the common control signal in the given measurement period T).

For example, the common control signal transmission unit 13 is configured to reduce the transmission power level of the common control signal if the above average value of the reception power levels of the common control signal in the given measurement period T falls below a first threshold.

Here, the common control signal transmission unit 13 is configured to reduce the transmission power level of the common control signal if detecting a condition where no mobile station under control of the radio base station 200 (mobile station in communication or in standby) exists with reference to the mobile station condition management unit 11.

Particularly, the common control signal transmission unit 13 is configured to stop transmitting the common control signal if detecting the condition where no mobile station under control of the radio base station 200 exists with reference to the mobile station condition management unit 11.

(Operation of Mobile Communication System According to First Embodiment of Present Invention)

With reference to FIG. 4, description is given of an operation of the mobile communication system according to the first embodiment of the present invention. More specifically, description is given of an operation for adjusting coverage areas of the radio base stations 200 and 201 in a case where the radio base station 201 having a coverage area adjacent to the coverage area of the radio base station 200 is newly installed while the radio base station 200 is in operation.

As shown in FIG. 4, in Step S1000, the newly-installed radio base station 201 tries to receive a common control signal channel being transmitted by a neighboring radio base station.

In Step S1001, the radio base station 201 receives a common control signal being transmitted by the radio base station 200.

In Step S1002, the radio base station 201 sets a transmission power level of a common control signal to be transmitted by the station itself on the basis of a reception power level of the common control signal of the radio base station 200.

Figure 5A:
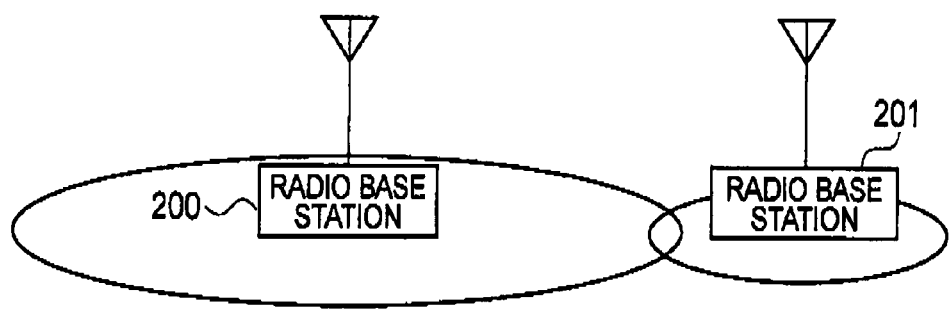
FIG. 5 is a diagram showing a change of coverage areas of radio base stations in the mobile communication system according to the first embodiment of the present invention.
Figure 5B:
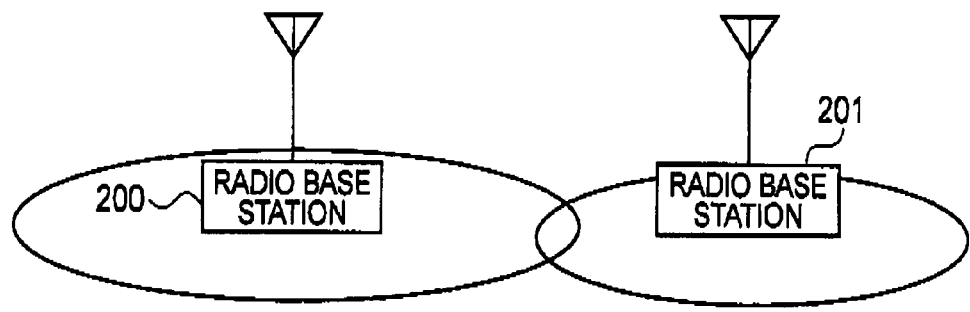

In this case, a relation between a coverage area of the radio base station 200 and a coverage area of the radio base station 201 is as shown in FIG. 5(*a*). Since the coverage area of the radio base station 201 is adjusted on the basis of the reception power level of the common control signal transmitted by the radio base station 200 so that the radio base station 201 would not interfere with the radio base station 200, the coverage area of the radio base station 201 is relatively narrower than the coverage area of the radio base station 200.

In the meantime, the radio base station 201 does not need to scale down the coverage area of the station itself since the radio base station 201 does not receive any interference from the radio base station 200.

The radio base station 200 stops transmitting the common control signal in Step S1004 if detecting that no mobile station exists in cells under control of the radio base station 200 in Step S1003.

The radio base station 201 repeatedly measures a reception power level of a common control signal being transmitted by a neighboring radio base station. Thus, if the radio base station 201 detects in Step S1005 that an average value of the reception power levels in the measurement period T becomes small (see FIG. 3) and the average value of the reception power levels falls below the first threshold because the transmission of the common control signal by the radio base station 200 is turned off, the radio base station 201 reduces the transmission power level of the common control signal transmitted by the station itself in Step S1006.

In other words, the radio base station 201 reduces the transmission power level if detecting that the average value of the reception power levels falls below the first threshold, since this means that the radio base station 201 detects a reduction of interference.

Meanwhile, after turning off the transmission of the common control signal for a certain period of time, in Step S1007 the radio base station 200 measures an average value of reception power levels of a common control signal being transmitted by a neighboring radio base station, and determines a transmission power level of a common control signal of the station itself on the basis of the average value of the reception power levels, like the radio base station 201 does.

In other words, the radio base station 200 increases the transmission power level if detecting that the average value of the reception power levels exceeds the first threshold, since this means that the radio base station 200 detects an increase of interference.

In this event, the transmission power level of the common control signal of the radio base station 201 is larger than that measured before the transmission of the common control signal of the radio base station 200 is turned off. Hence, the radio base station 200 reduces the transmission power level of the common control signal of the radio base station 200 in Step S1008 if detecting that the reception power level of the common control signal being transmitted by the radio base station 201 exceeds a third threshold.

In this case, the relation between the coverage area of the radio base station 200 and the coverage area of the radio base station 201 is as shown in FIG. 5(*b*). A difference between the transmission power level of the common control signal of the radio base station 200 and the transmission power level of the common control signal of the radio base station 201 is smaller than that in the case of FIG. 5(*a*). Thus, a fairer area adjustment is made between the radio base station 200 and the radio base station 201.

By repeatedly performing the above procedure, a change of the areas is settled down under a condition in which the coverage area of the radio base station 200 and the coverage area of the radio base station 201 are substantially the same.

(Operations and Effects of Mobile Communication System According to First Embodiment of Present Invention)

According to the mobile communication system of the first embodiment of the present invention, each of radio base stations, which is capable of autonomously adjusting a transmission power level of its common control signal in accordance with a reception power level of a common control signal transmitted by its neighboring radio base station, reduces the transmission of its common control signal when no mobile station exists in cells under control of the radio base station. In this way, a fairer coverage area adjustment can be made between the radio base station 200 and the radio base station 201.

Modified Example

The above embodiment is described taking a W-CDMA mobile communication system as an example. However, the present invention is not limited to such a mobile communication system. For example, the present invention is also applicable to a LTE (Long Term Evolution) mobile communication system.

Specifically, according to the present invention, each of radio base stations autonomously adjusts a transmission power level of its common control signal on the basis of a reception power level of a common control signal transmitted by its neighboring radio base station. Accordingly, the same operation can be performed independent of a network configuration such as a W-CDMA system or a LTE system.

Here, when the mobile communication system according to this embodiment is a LTE mobile communication system, at least a part of the function of the above network device 100 may be installed in each of the radio base stations 200 and 201 or an exchange MME.

Note that, when the mobile communication system according to this embodiment is a LTE mobile communication system and when a consolidation device HNB-GW housing the radio base stations 200 and 201 is provided, at least apart of the function of the above network device 100 may be installed in the consolidation device HNB-GW.

Further, when the mobile communication system according to this embodiment is a W-CDMA mobile communication system and when the consolidation device HNB-GW housing the radio base stations 200 and 201 is provided, at least a part of the function of the above network device 100 may be installed in the consolidation device HNB-GW.

Furthermore, when the mobile communication system according to this embodiment is a W-CDMA, mobile communication system, at least a part of the function of the above network device 100 may be installed in an exchange MSC/SGSN.

Note that operation of the above described the above radio base stations 200, 201 and the network device 100 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the radio base stations 200, 201 and the network device 100. Also, the storage medium and the processor may be provided in the radio base stations 200, 201 and the network device 100 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method with which radio base stations each transmit a common control signal to an entire coverage area thereof, the method comprising:
   A) causing a first radio base station to measure a reception power level of a common control signal transmitted by a neighboring radio base station;
   B) causing the first radio base station to adjust a transmission power level of the common control signal on the basis of the measured reception power level of the common control signal; and
   C) causing each of the first radio base station and the neighboring radio base station to reduce the transmission power level of the common control signal if detecting a condition where no mobile station under control of the radio base station exists, wherein in the step B,
   the first radio base station reduces the transmission power level of the common control signal, when an average value of the measured reception power level in a predetermined measurement duration falls below a first threshold,
   the first radio base station increases the transmission power level of the common control signal, when the average value of the measured reception power level in the predetermined measurement duration exceeds the first threshold, and
   the first radio base station reduces the transmission power level of the common control signal, when the average value of the measured reception power level in the predetermined measurement duration exceeds a third threshold larger than the first threshold.

2. The mobile communication method according to claim 1, wherein, in the step C, each of the first radio base station and the neighboring radio base station stops transmitting the common control signal for a predetermined duration of time if detecting that no mobile station under control of the radio base station exists.

3. The mobile communication method according to claim 1, wherein, in the step A, the first radio base station identifies the common control signal transmitted by the neighboring radio base station, by using at least one of a predetermined frequency, timing, and code.

4. A radio base station configured to transmit a common control signal to an entire coverage area thereof, the radio base station comprising:
   a measurement unit configured to measure a reception power level of a common control signal transmitted by a neighboring radio base station; and
   an adjustment unit configured to adjust a transmission power level of the common control signal on the basis of the measured reception power level of the common control signal, wherein the adjustment unit reduces the transmission power level of the common control signal if detecting a condition where no mobile station under control of the radio base station exists, wherein
   the adjustment unit reduces the transmission power level of the common control signal, when an average value of the measured reception power level in the predetermined measurement duration falls below a first threshold,
   the adjustment unit increases the transmission power level of the common control signal, when the average value of the measured reception power level in the predetermined measurement duration exceeds the first threshold, and
   the adjustment unit reduces the transmission power level of the common control signal, when the average value of the measured reception power level in the predetermined measurement duration exceeds a third threshold larger than the first threshold.

5. The radio base station according to claim 4, wherein the adjustment unit stops transmitting the common control signal for a predetermined duration if detecting that no mobile station under control of the radio base station exists.

6. The radio base station according to claim 4, wherein the adjustment unit identifies the common control signal transmitted by the neighboring radio base station by using at least one of a predetermined frequency, timing, and code.

* * * * *